(12) United States Patent
Ikeda et al.

(10) Patent No.: US 7,681,611 B2
(45) Date of Patent: Mar. 23, 2010

(54) TIRE CAVITY RESONANCE RESTRICTING DEVICE AND PNEUMATIC TIRE

(75) Inventors: Toshiyuki Ikeda, Hiratsuka (JP); Atsushi Tanno, Hiratsuka (JP); Hiroshi Yamauchi, Tokyo (JP); Yasuji Akiyoshi, Tokyo (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 892 days.

(21) Appl. No.: 10/584,665

(22) PCT Filed: Jan. 28, 2005

(86) PCT No.: PCT/JP2005/001233

§ 371 (c)(1), (2), (4) Date: Jun. 27, 2006

(87) PCT Pub. No.: WO2005/072991

PCT Pub. Date: Aug. 11, 2005

(65) Prior Publication Data

US 2009/0139620 A1 Jun. 4, 2009

(30) Foreign Application Priority Data

Jan. 29, 2004 (JP) .............................. 2004-020677

(51) Int. Cl.
*B60C 5/00* (2006.01)
*B60C 19/00* (2006.01)

(52) U.S. Cl. ......................... 152/155; 152/157; 152/450
(58) Field of Classification Search ................. 152/155, 152/157, 158, 450
See application file for complete search history.

(56) References Cited

FOREIGN PATENT DOCUMENTS

| JP | 2002-120509 | 4/2002 |
|---|---|---|
| JP | 2003-226104 | 8/2003 |
| JP | 2003-252003 | * 9/2003 |
| JP | 2004-291905 | 10/2004 |
| WO | WO 02/085648 | 10/2002 |

* cited by examiner

*Primary Examiner*—Justin Fischer
(74) *Attorney, Agent, or Firm*—Greer, Burns & Crain, Ltd.

(57) ABSTRACT

A tire cavity resonance restricting device to be mounted on the inner surface of the tread portion facing to the cavity of a pneumatic tire. The tire cavity resonance restricting device includes a cross-sectional area changing member for changing the cross-sectional area of the cavity in tire meridian cross section, and an elastic fixing member in the form of a ring for fixing the cross-sectional area changing member to the inner surface of the tread portion. The elastic fixing member has an attachment portion to which the cross-sectional area changing member is attached and a non-attachment portion to which the cross-sectional area changing member is not attached. The non-attachment portion is greater in mass than the attachment portion.

11 Claims, 3 Drawing Sheets

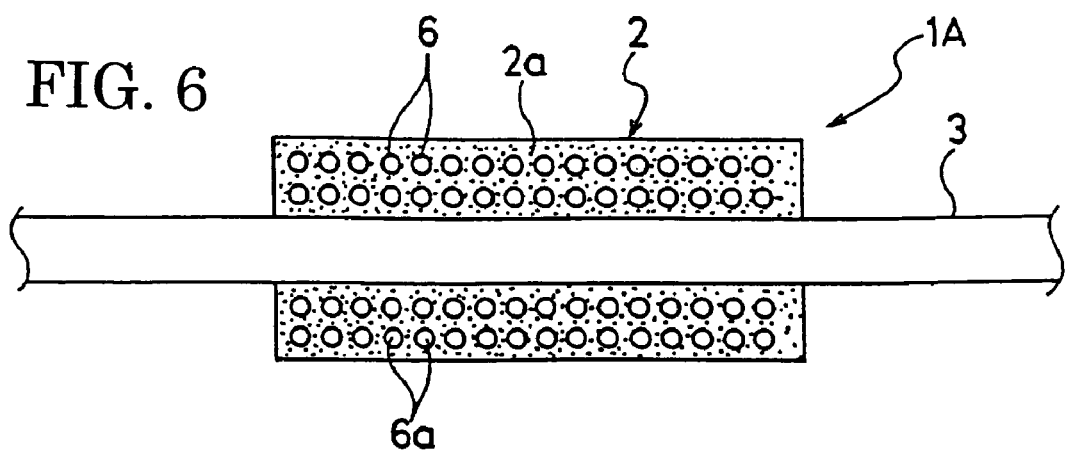
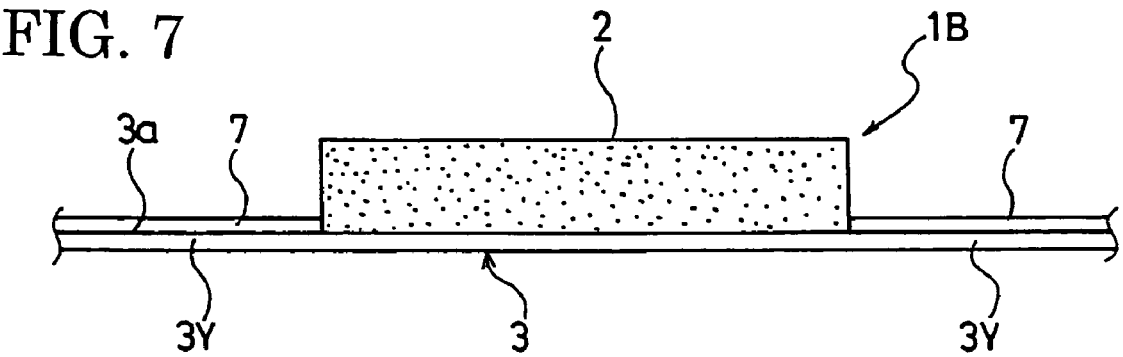

TIRE CAVITY RESONANCE RESTRICTING DEVICE AND PNEUMATIC TIRE

TECHNICAL FIELD

The present invention relates to tire cavity resonance restricting devices and pneumatic tires, and more particularly, to a tire cavity resonance restricting device which can reduce tire vibration and a pneumatic tire having the tire cavity resonance restricting device.

TECHNICAL BACKGROUND

One of the main causes of tire noise is cavity resonance created in the cavity of a pneumatic tire that is airtightly formed between the rim of a wheel and the tire mounted on the rim. The cavity resonance participates in, for example, noise we constantly hear near 250 Hz during running, and impact sounds produced in passing the joints of a road or the like.

As an approach for reducing noise created by such cavity resonance, it has been proposed to place a sound absorbing member in the cavity of a tire to absorb the resonance noise, or to provide shielding plates on a rim so as to section the cavity of a tire. However, since the sound absorbing member is not one that fundamentally restricts the occurrence of the cavity resonance, noise can not be effectively reduced with a sound absorbing member that can actually be mounted on the inside of a tire. In the case where the shielding plates are mounted on a rim, performance of assembling a tire on the rim is deteriorated.

Recently, there has been proposed a tire cavity resonance restricting device that can effectively reduce the cavity resonance noise by constantly varying the frequency of the resonance with the rotation of the wheel by changing the cross-sectional shape of the tire cavity in the tire circumferential direction (see Patent Documents 1 and 2). However, a tire having the tire cavity resonance restricting device has uneven mass distribution around the circumference, which produces a problem of assisting tire vibration during running of a vehicle.

Patent Document 1: Japanese Patent Application Kokai Publication No. 2000-113902

Patent Document 2: Japanese Patent Application Kokai Publication No. 2003-226104

DISCLOSURE OF THE INVENTION

An object of the present invention is to provide a tire cavity resonance restricting device capable of reducing tire vibration without impairing the reduction effect of cavity resonance sound.

In order to achieve the above object, the present invention provides a tire cavity resonance restricting device to be mounted on an inner surface of a tread portion facing to a cavity of a pneumatic tire, comprising; a cross-sectional area changing member for changing a cross-sectional area of the cavity in tire meridian cross section; and an elastic fixing member in a form of a ring for fixing the cross-sectional area changing member to the inner surface of the tread portion, the elastic fixing member having an attachment portion to which the cross-sectional area changing member is attached and a non-attachment portion to which the cross-sectional area changing member is not attached, wherein the non-attachment portion of the elastic fixing member is greater in mass than the attachment portion thereof.

The present invention provides another tire cavity resonance restricting device to be mounted on an inner surface of a tread portion facing to a cavity of a pneumatic tire, comprising; a cross-sectional area changing member for changing a cross-sectional area of the cavity in tire meridian cross section; and an elastic fixing member in a form of a ring for fixing the cross-sectional area changing member to the inner surface of the tread portion, wherein the cross-sectional area changing member attached to the elastic fixing member has holes formed therein.

The present invention provides still another tire cavity resonance restricting device to be mounted on an inner surface of a tread portion facing to a cavity of a pneumatic tire, comprising; a cross-sectional area changing member for changing a cross-sectional area of the cavity in tire meridian cross section; and an elastic fixing member in a form of a ring for fixing the cross-sectional area changing member to the inner surface of the tread portion, the elastic fixing member having an attachment portion to which the cross-sectional area changing member is attached and a non-attachment portion to which the cross-sectional area changing member is not attached, wherein a mass adjusting element is provided on the non-attachment portion.

The present invention provides still another tire cavity resonance restricting device to be mounted on an inner surface of a tread portion facing to a cavity of a pneumatic tire, having an annular cross-sectional area changing member that is arranged so as to be able to change a cross-sectional area of the cavity in tire meridian cross section, the device having regions formed when the tire cavity resonance restricting device is equally sectioned into thirty-six regions at given positions around a circumference thereof along a direction of the circumference, the regions including one region having a maximum mass $Ma$ and one region having a minimum mass $Mb$, a mass ratio $Ma/Mb$ being one to ten.

A pneumatic tire according to the present invention has any of the above tire cavity resonance restricting devices.

According to the present invention described above, since the mass distribution of a pneumatic tire having the tire cavity resonance restricting device can be more even than before around the circumference thereof, tire vibration produced during running of a vehicle can be reduced. There is no alternation of the cross-sectional area of the cross-sectional area changing member affecting on the restriction of cavity resonance, avoiding impairing the restriction effect of cavity resonance.

BRIEF DESCRIPTION OF THE DRAWINGS

FIG. 6 is a partial enlarged view showing still anther embodiment of a tire cavity resonance restricting device according to the present invention, seen from the radially inner side.

FIG. 7 is a partial enlarged side view showing still anther embodiment of a tire cavity resonance restricting device according to the present invention.

BEST MODES FOR CARRYING OUT THE INVENTION

Embodiments of the present invention will be described in detail below with reference to the attached drawings.

Figure 1:
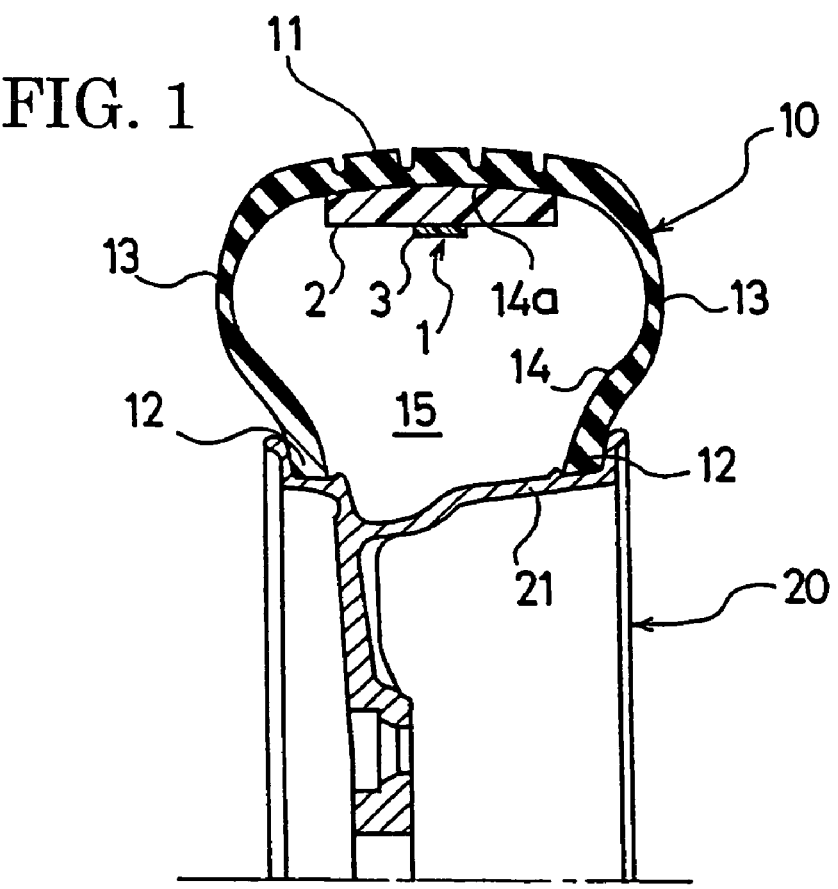
FIG. 1 is a tire meridian cross-sectional view showing an embodiment of a pneumatic tire having a tire cavity resonance restricting device according to the present invention.

Referring to FIG. 1, there is shown a pneumatic tire having a tire cavity resonance restricting device according to the present invention; reference numeral 1 denotes a tire cavity resonance restricting device, and reference numeral 10 denotes a pneumatic tire shown in a state where it is mounted on the rim 21 of a wheel 20.

The pneumatic tire 10 includes a tread portion 11, right and left bead portions 12, and right and left sidewall portions 13 connecting the tread portion 11 and the bead portions 12. A space is surrounded by a tire inner surface 14 is a cavity 15, and the pneumatic tire 10 is mounted on the wheel 20 so that the cavity 15 is sealed by the rim 21.

Although not shown in the drawing, a carcass ply extends between the right and left bead portions 12 in the tire, and a plurality of belt plies are provided radially outwardly of the carcass ply in the tread portion 11. Bead cores are embedded in the right and left bead portions 12, and the opposite ends of the carcass ply are wrapped around the bead cores from the inner side of the tire toward the outer side thereof.

The tire cavity resonance restricting device 1, which is mounted on the inner surface 14a of the tread portion 11 facing to the cavity 15 of the pneumatic tire 10, includes cross-sectional area changing members 2 for changing the cross-sectional area of the cavity 15 in tire meridian cross section, and a ring-shaped elastic fixing member 3 for fixing the cross-sectional area changing members 2 on the inner surface 14a of the tread portion 11.

Figure 2:
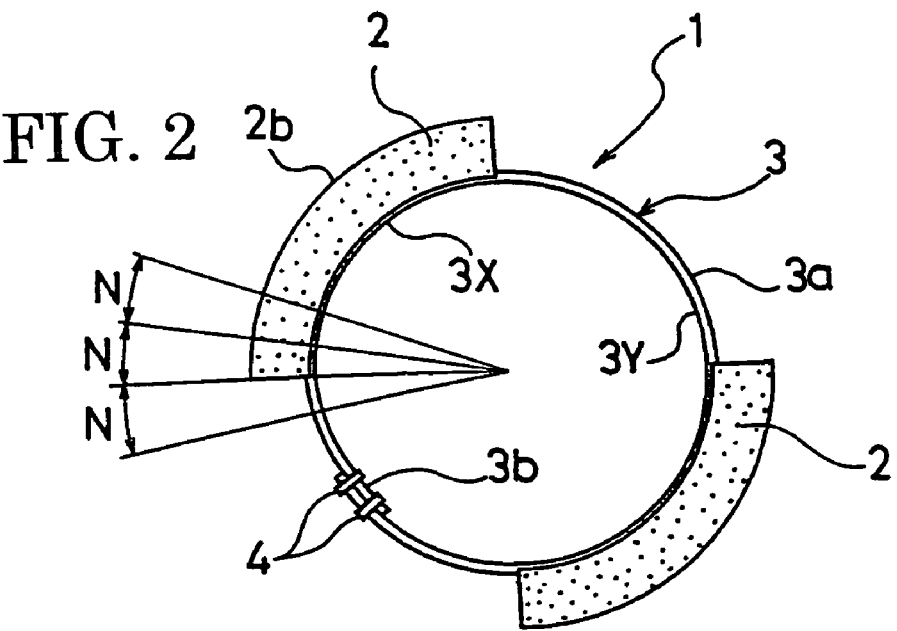
FIG. 2 is a side view of the tire cavity resonance restricting device shown in FIG. 1.

As shown in FIG. 2, the cross-sectional area changing members 2 each have a fixed thickness, and are attached to the radially outer surface 3a of the elastic fixing member 3 at two positions opposing each other. Without limitation to the two positions shown in the drawing, the cross-sectional area changing members 2 may be placed at a plurality of positions more than two. Preferably, the cross-sectional area changing members are disposed at two to four positions at equal intervals.

There is no particular limitation to the material used for the cross-sectional area changing members 2 if the material is one that can change the cross-sectional area; however, a material having a low specific gravity is preferably used therefor in terms of weight saving; resin foam, for example, can preferably be mentioned. Preferably, the cross-sectional area changing members 2 are each made from a sponge formed of resin foam or the like.

The elastic fixing member 3 is a belt-shaped band formed of an elastic element and is in the form of a ring by fastening its opposite ends 3b to each other with a pair of fastening bands 4. The tire cavity resonance restricting device 1 is to be mounted on the inner surface 14a of the tread portion 11, using the elastic force of the elastic fixing member 3.

Figure 3:
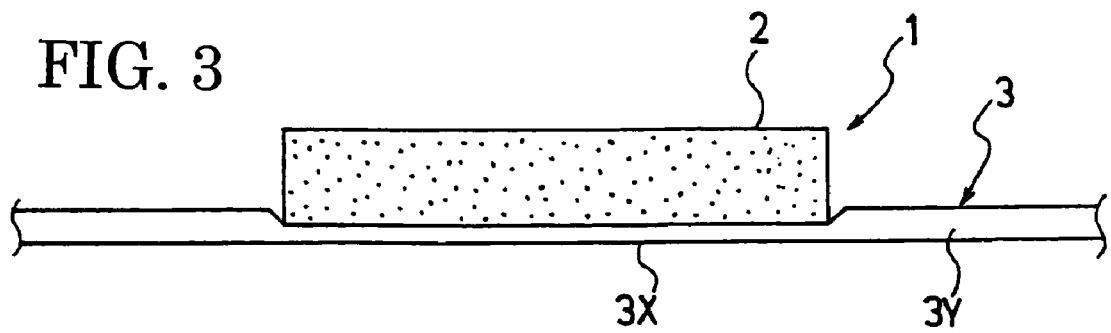
FIG. 3 is a partial enlarged view of the tire cavity resonance restricting device shown in FIG. 2.

The elastic fixing member 3 includes attachment portions 3X to which the cross-sectional area changing members 2 are attached, and non-attachment portions 3Y to which the cross-sectional area changing members 2 are not attached; as shown in FIG. 3, the non-attachment portions 3Y are greater in thickness than the attachment portions 3X, whereby the mass of the elastic fixing member 3 is arranged such that the non-attachment portions 3Y are heavier than the attachment portions 3X.

The material used for the elastic fixing member 3 may be any one that can provide elasticity enabling the mounting; preferable examples of the material include metal such as stainless steel, and resin such as nylon resin and polypropylene resin.

Figure 4:
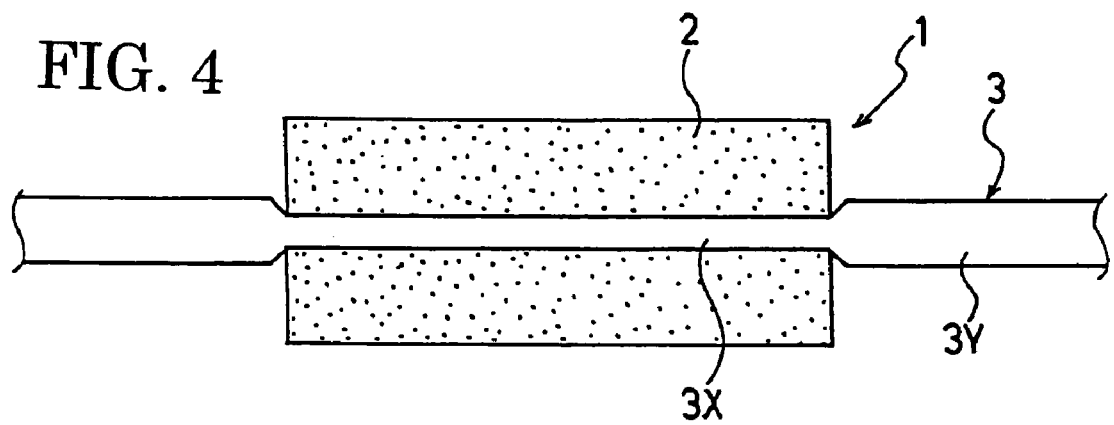
FIG. 4 is a partial enlarged view showing anther embodiment of a tire cavity resonance restricting device according to the present invention, seen from the radially inner side.
Figure 5:
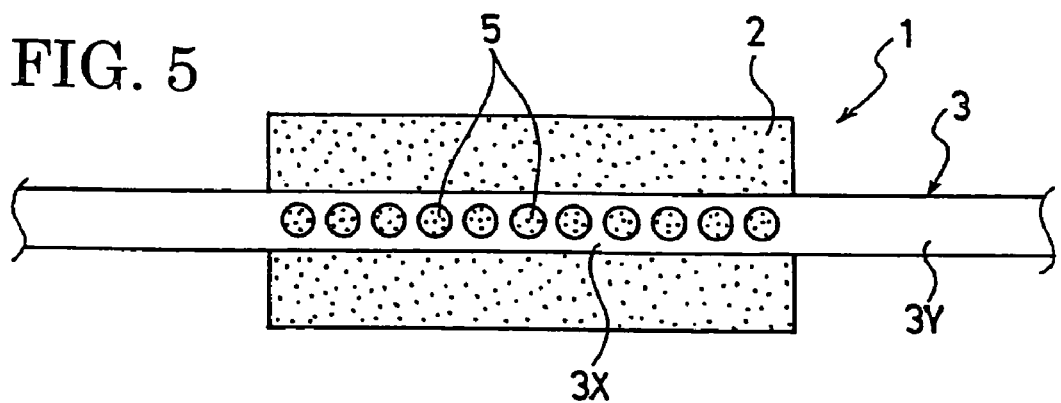
FIG. 5 is a partial enlarged view showing still anther embodiment of a tire cavity resonance restricting device according to the present invention, seen from the radially inner side.

In the alternative of the structure shown in FIG. 3, the technique for making the non-attachment portions 3Y greater in mass than the attachment portions 3X may be one shown in FIG. 4 or 5. In FIG. 4, the width of the elastic fixing member 3 is arranged such that the non-attachment portions 3Y are wider than the attachment portions 3X; in FIG. 5, only the attachment portions 3X of the elastic fixing member 3 have a plurality of through holes 5 formed therein at predetermined intervals along the circumferential direction thereof. The elastic fixing members 3 shown in FIGS. 4 and 5 are each constant in thickness.

According to the pneumatic tire 10 having the above-described tire cavity resonance restricting device 1, the cross-sectional area of the cavity 15 in tire meridian cross section is changed in the circumferential direction of the tire by the cross-sectional area changing members 2, which constantly vary the frequency of the cavity resonance with the rotation of the tire, shortening resonance time periods at the same frequency. Therefore, noise that is attributable to the cavity resonance of about 200 to 250 Hz and is problematic in the prior art can effectively be reduced. On the other hand, the mass of the elastic fixing member 3 is arranged such that the non-attachment portions 3Y are heavier than the attachment portions 3X where the cross-sectional area changing members 2 are attached, whereby the mass distribution of the tire cavity resonance restricting device 1 around the circumference can be more even than before. Accordingly, the pneumatic tire 10 with the tire cavity resonance restricting device 1 can reduce tire vibration produced during running of a vehicle.

Referring to FIG. 6, there is shown a main part of another embodiment of a tire cavity resonance restricting device according to the present invention. This tire cavity resonance restricting device 1A has the same construction as the above-described tire cavity resonance restricting device 1 of FIG. 1 except that the elastic fixing member 3 in the form of a ring is constant in thickness while the cross-sectional area changing members 2 each have a plurality of holes 6 formed in the inner circumferential surface 2a thereof, the formation of the holes makes each cross-sectional area changing member 2 lighter in weight, thereby making the mass distribution of the tire cavity resonance restricting device 1A more even than before around the circumference.

The holes 6 may be ones that penetrate from the inner circumferential surface 2a to an outer circumferential surface 2b (see FIG. 2) or ones that does not penetrate. The holes 6 are preferably formed in the inner circumferential surface 2a as shown in the drawing so as to have openings 6a facing to the cavity 15, thereby enabling the cavity resonance to be further suppressed using the holes 6.

Referring to FIG. 7, there is shown still another embodiment of a tire cavity resonance restricting device according to the present invention. This tire cavity resonance restricting device 1B has the same construction as the above-described tire cavity resonance restricting device 1 of FIG. 1 except that the elastic fixing member 3 in the form of a ring is constant in thickness while a belt-shaped mass adjusting element 7 is provided on each non-attachment portion 3Y, thereby rendering the mass distribution of the tire cavity resonance restricting device 1B more even than before around the circumference.

A material known in the prior art can be used for the mass adjusting element 7 if the material is adjustable in mass; the mass adjusting element is preferably formed from an element having a density ($kg/m^3$) that is five time greater or more than the apparent density of the cross-sectional area changing member 2; rubber, for example, can preferably used in terms of mass and durability. There is no particular limitation to the upper limit of the density of the element from which the mass adjusting element 7 is formed; the density is better as it is greater because the mass adjusting element 7 can be thinner in thickness. It is preferable, in terms of rendering the mass distribution of the tire cavity resonance restricting device 1A still more even, that the mass adjustment element 7 be continuously and uniformly in thickness provided on at least one surface (outer circumferential surface 3a is shown in the drawing as one example) of each non-attachment portion 3Y along the circumferential direction throughout the full length of the non-attachment portion 3Y.

As is obvious, the structures shown in FIGS. 3, 4, 5, 6 and 7 may be properly combined.

In the present invention, each of the above-described tire cavity resonance restricting devices 1, 1A and 1B has, as partly shown in FIG. 2, regions (regions each having a section angle of 10°) N formed when the tire cavity resonance restricting device is equally sectioned into thirty-six regions at given positions around the circumference of the elastic fixing member 3 in the form of a ring along the circumferential direction thereof; the regions N includes one region Na having the maximum mass Ma (kg) and one region Nb having the minimum mass Mb (kg); it is preferable in terms of effectively reducing tire vibration that the mass ratio Ma/Mb be in the range of one to ten. The mass ratio is more preferably in the range of one to five, further more preferably in the range of one to three from the viewpoint of uniformity, especially RFV (radial force variation).

In the embodiments described above, there have been illustrated tire cavity resonance restricting devices 1, 1A and 1B each having cross-sectional area changing members 2 for changing the cross-sectional area of the tire cavity 15 in tire meridian cross section, and an elastic fixing member 3 in the form of a ring for fixing the cross-sectional area changing members 2 to the inner surface 14a of the tread portion 14; however, the present invention is not limited thereto, but may include, for example, a tire cavity resonance restricting device consisting of an annular cross-sectional area changing member that has a wavy or patterned uneven inner circumferential surface to change the cross-sectional area of the cavity 15; the tire cavity resonance restricting device is to be fixed to the inner surface 14a of the tread portion 14 without the elastic fixing member 3 but with an adhesive or the like. In the case of such a tire cavity resonance restricting device consisting of the annular cross-sectional area changing member also, the mass ratio Ma/Mb is set in the above range to thereby allow tire vibration to be reduced.

Example

Prepared were a tire cavity resonance restricting device (present example) having mass adjusting elements and a tire cavity resonance restricting device (comparative example) having no mass adjusting elements, used for a pneumatic tire having a tire size of 205/65R15.

A sponge (cross-sectional area of $6.0 \times 10^{-3}$ $m^2$) of resin foam having a density of 50 $kg/m^3$ was used for each of the cross-sectional area changing members of the tire cavity resonance restricting devices, and a band (cross-sectional area of $2.0 \times 10^{-5}$ $m^2$) of polypropylene resin having a density of 900 $kg/m^3$ was used for each of the elastic fixing members of the tire cavity resonance restricting devices; the cross-sectional area changing members were attached to the elastic fixing member at two positions as shown in FIG. 2. Rubber having a density of 1300 $kg/m^3$ was used for the mass adjusting elements, each having a cross-sectional area of $1.2 \times 10^{-5}$ $m^2$. The mass ratio Ma/Mb of each tire cavity resonance restricting devices is as shown in Table 1.

Each tire cavity resonance restricting device was attached to a pneumatic tire having a tire size of 205/65R15; the pneumatic tire was seated on a rim having a rim size of 15×6 1/2JJ, inflated to an air pressure of 220 kPa, and mounted on a passenger car of 2500 cc displacement. Evaluation testing for the cavity resonance noise and vibration of the tire was conducted according to the following method, obtaining the results shown in Table 1.

Tire Cavity Resonance Noise and Tire Vibration

Feeling testing was carried out on a test coarse by a test drive; the testing results were evaluated on the basis of those obtained when a pneumatic tire having no tire cavity resonance restricting device was used.

TABLE 1

|  | Present Example | Comparative Example |
| --- | --- | --- |
| Ma/Mb | 9.5 | 17.5 |
| Cavity Resonance Noise | Improvement | Improvement |
| Vibration | Same Level | Deterioration |

As seen from Table 1, the present invention can reduce tire vibration while maintaining a cavity resonance restricting effect.

INDUSTRIAL APPLICABILITY

The tire cavity resonance restricting device of the present invention having the aforementioned excellent effects is very effectively usable as a device that reduces tire noise arising from the cavity of a pneumatic tire.

What is claimed is:

1. A tire cavity resonance restricting device to be mounted on an inner surface of a tread portion facing to a cavity of a pneumatic tire, comprising;
   a cross-sectional area changing member for changing a cross-sectional area of the cavity in tire meridian cross section; and
   an elastic fixing member in a form of a ring for fixing the cross-sectional area changing member to the inner surface of the tread portion, the elastic fixing member having an attachment portion to which the cross-sectional area changing member is attached and a non-attachment portion to which the cross-sectional area changing member is not attached,
   wherein the non-attachment portion of the elastic fixing member is greater in mass than the attachment portion thereof,
   wherein the non-attachment portion of the elastic fixing member is greater in thickness than the attachment portion thereof.

2. A tire cavity resonance restricting device to be mounted on an inner surface of a tread portion facing to a cavity of a pneumatic tire, comprising;

a cross-sectional area changing member for changing a cross-sectional area of the cavity in tire meridian cross section; and an elastic fixing member in a form of a ring for fixing the cross-sectional area changing member to the inner surface of the tread portion, the elastic fixing member having an attachment portion to which the cross-sectional area changing member is attached and a non-attachment portion to which the cross-sectional area changing member is not attached, wherein the non-attachment portion of the elastic fixing member is greater in mass than the attachment portion thereof, wherein the non-attachment portion of the elastic fixing member is greater in width than the attachment portion thereof.

3. A tire cavity resonance restricting device to be mounted on an inner surface of a tread portion facing to a cavity of a pneumatic tire, comprising:

a cross-sectional area changing member for changing a cross-sectional area of the cavity in tire meridian cross section; and an elastic fixing member in a form of a ring for fixing the cross-sectional area changing member to the inner surface of the tread portion, the elastic fixing member having an attachment portion to which the cross-sectional area changing member is attached and a non-attachment portion to which the cross-sectional area changing member is not attached, wherein the non-attachment portion of the elastic fixing member is greater in mass than the attachment portion thereof, wherein the attachment portion of the elastic fixing member has holes formed therein.

4. A tire cavity resonance restricting device to be mounted on an inner surface of a tread portion facing to a cavity of a pneumatic tire, comprising;

a cross-sectional area changing member for changing a cross-sectional area of the cavity in tire meridian cross section; and an elastic fixing member in a form of a ring for fixing the cross-sectional area changing member to the inner surface of the tread portion, wherein the cross-sectional area changing member attached to the elastic fixing member has through holes formed there in.

5. A tire cavity resonance restricting device according to claim 4, wherein the holes have openings facing to the cavity.

6. A tire cavity resonance restricting device to be mounted on an inner surface of a tread portion facing to a cavity of a pneumatic tire, comprising;

a cross-sectional area changing member for changing a cross-sectional area of the cavity in tire meridian cross section; and an elastic fixing member in a form of a ring for fixing the cross-sectional area changing member to the inner surface of the tread portion, the elastic fixing member having an attachment portion to which the cross-sectional area changing member is attached and a non-attachment portion to which the cross-sectional area changing member is not attached, wherein a mass adjusting element is continuously provided on the non-attachment portion along the circumferential direction throughout the full length of the non-attachment portion.

7. A tire cavity resonance restricting device according to claim 6, wherein the mass adjusting element is formed from an element having a density that is five time greater or more than an apparent density of the cross-sectional area changing member.

8. A tire cavity resonance restricting device according to any one of claims 1-4 and 6, having regions formed when the tire cavity resonance restricting device is equally sectioned into thirty-six regions at given positions around a circumference of the elastic fixing member in the form of a ring along a direction of the circumference, the regions including one region having a maximum mass Ma and one region having a minimum mass Mb, a mass ratio Ma/Mb being one to ten.

9. A tire cavity resonance restricting device according to any one of claims 1-4 and 6, wherein the elastic fixing member is formed from a belt-shaped band made of metal or resin.

10. A tire cavity resonance restricting device according to any one of claims 1-4 and 6, wherein the cross-sectional area changing member is formed of a sponge.

11. A pneumatic tire having a tire cavity resonance restricting device according to any one of claims 1-4 and 6.

* * * * *